(12) United States Patent
Li et al.

(10) Patent No.: US 10,216,530 B2
(45) Date of Patent: Feb. 26, 2019

(54) METHOD FOR MAPPING BETWEEN VIRTUAL CPU AND PHYSICAL CPU AND ELECTRONIC DEVICE

(71) Applicant: Huawei Technologies Co., Ltd., Shenzhen (CN)

(72) Inventors: Jian Li, Shanghai (CN); Haibing Guan, Shanghai (CN); Qiang Gu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 114 days.

(21) Appl. No.: 15/375,919

(22) Filed: Dec. 12, 2016

(65) Prior Publication Data

US 2017/0090962 A1 Mar. 30, 2017

Related U.S. Application Data

(63) Continuation of application No. PCT/CN2015/075490, filed on Mar. 31, 2015.

(30) Foreign Application Priority Data

Jun. 12, 2014 (CN) .......................... 2014 1 0262063

(51) Int. Cl.
G06F 9/46 (2006.01)
G06F 9/455 (2018.01)
G06F 13/42 (2006.01)

(52) U.S. Cl.
CPC ...... *G06F 9/45533* (2013.01); *G06F 9/45558* (2013.01); *G06F 13/4234* (2013.01); *G06F 2009/4557* (2013.01); *G06F 2009/45583* (2013.01)

(58) Field of Classification Search
CPC ............ G06F 9/45533; G06F 13/4234; G06F 2009/45583; G06F 9/45558; G06F 2009/4557

(Continued)

(56) References Cited

U.S. PATENT DOCUMENTS

| 2008/0163203 A1* | 7/2008 | Anand | G06F 9/45533 718/1 |
| 2009/0024994 A1* | 1/2009 | Kannan | G06F 9/45533 718/1 |

(Continued)

FOREIGN PATENT DOCUMENTS

| CN | 1359041 A | 7/2002 |
| CN | 101169731 A | 4/2008 |

(Continued)

OTHER PUBLICATIONS

Machine Translation and Abstract of Chinese Publication No. CN1359041, Jul. 17, 2002, 3 pages.

(Continued)

*Primary Examiner* — Camquy Truong
(74) *Attorney, Agent, or Firm* — Conley Rose, P.C.

(57) ABSTRACT

A method for mapping between a virtual central processing unit (CPU) and a physical CPU. The method includes obtaining, by a virtual machine manager, a set of to-be-mapped first virtual CPUs in a current time period and a first physical CPU that has fewest to-be-run tasks, obtaining, by the virtual machine manager, a first characteristic value of each first virtual CPU in the set of first virtual CPUs and a second characteristic value of the first physical CPU, obtaining, by the virtual machine manager from all the first characteristic values, a target characteristic value that matches the second characteristic value, and mapping a target virtual CPU corresponding to the target characteristic value to the first physical CPU for running. By means of the (Continued)

foregoing technical solutions, resource contention and a decrease in overall system performance are avoided when mapping a virtual CPU to a physical CPU.

14 Claims, 5 Drawing Sheets

(58) Field of Classification Search
USPC .......................................................... 718/1
See application file for complete search history.

(56) References Cited

U.S. PATENT DOCUMENTS

| 2011/0013519 | A1* | 1/2011 | Chang | G06F 9/5033 370/241 |
|---|---|---|---|---|
| 2012/0047383 | A1 | 2/2012 | Laor et al. | |
| 2012/0054762 | A1 | 3/2012 | Moon et al. | |

FOREIGN PATENT DOCUMENTS

| CN | 101561769 A | 10/2009 |
|---|---|---|
| CN | 103049332 A | 4/2013 |

OTHER PUBLICATIONS

Machine Translation and Abstract of Chinese Publication No. CN103049332, Apr. 17, 2013, 10 pages.
Ge, R., et al., "Performance-constrained Distributed DVS Scheduling for Scientific Applications on Power-aware Clusters," Nov. 12-15, 2005, 11 pages.
Laszewski, G., et al., "Power-Aware Scheduling of Virtual Machines in DVFS-enabled Clusters," IEEE International Conference on Cluster Computing and Workshops, Oct. 2009, 9 pages.
Merkel, A., et al., "Resource-conscious Scheduling for Energy Efficiency on Multicore Processors," EuroSys, Apr. 13-16, 2010, 14 pages.
Han, J., et al., "Synchronization-Aware Energy Management for VFI-Based Multicore Real-Time Systems," IEEE Transactions on Computers, vol. 61, No. 12, Dec. 2012, pp. 1682-1696.
Foreign Communication From a Counterpart Application, PCT Application No. PCT/CN2015/075490, English Translation of International Search Report dated May 6, 2015, 2 pages.
Foreign Communication From a Counterpart Application, PCT Application No. PCT/CN2015/075490, English Translation of Written Opinion dated May 6, 2015, 11 pages.

* cited by examiner

METHOD FOR MAPPING BETWEEN VIRTUAL CPU AND PHYSICAL CPU AND ELECTRONIC DEVICE

CROSS-REFERENCE TO RELATED APPLICATIONS

This application is a continuation of International Application No. PCT/CN2015/075490, filed on Mar. 31, 2015, which claims priority to Chinese Patent Application No. 201410262063.4, filed on Jun. 12, 2014, both of which are hereby incorporated by reference in their entireties.

TECHNICAL FIELD

The present disclosure relates to the field of electronic technologies, and in particular, to a method for mapping between a virtual central processing unit (CPU) and a physical CPU and an electronic device.

BACKGROUND

In a virtualization environment, from a perspective of a virtual machine, a virtual CPU is used to execute calculation, but essentially, a calculation function is executed by a physical CPU of a physical host on which the virtual machine is located. In a multi-core environment, when multiple physical CPUs and multiple virtual CPUs exist, a problem about how to map a virtual CPU to a physical CPU occurs.

In the prior art, to resolve the problem about how to map a virtual CPU to a physical CPU, each physical CPU manages a queue of virtual CPUs that can run locally. A priority of each virtual CPU has two statuses, scheduled (over) and to-be-scheduled (under). During scheduling, a scheduler preferentially schedules a virtual CPU whose current status is under, and if a physical CPU running queue does not have a virtual CPU whose priority is under, a virtual CPU whose priority is under is found from another CPU running queue.

However, in the prior art, virtual CPUs whose priorities are under may run tasks of a same task type. Because a resource contention factor is not considered when mapping a virtual CPU and a physical CPU, virtual CPUs that run tasks of a same task type may usually be mapped to different physical CPUs for running simultaneously, and technical problems of resource contention and a decrease in overall system performance exist.

SUMMARY

Embodiments of the present disclosure provide a method for mapping between a virtual CPU and a physical CPU and an electronic device so as to resolve prior-art technical problems of resource contention and a decrease in overall system performance that exist when a virtual CPU is mapped to a physical CPU.

According to a first aspect, the present disclosure provides a method for mapping between a virtual CPU and a physical CPU, where the method is applied to a multi-core system, the multi-core system includes at least two physical CPUs, a virtual machine manager, and at least one virtual machine, the virtual machine manager runs on any one of the at least two physical CPUs, the at least one virtual machine includes at least two virtual CPUs, the virtual machine manager can map the virtual CPUs to any one of the at least two physical CPUs for running, and the method includes obtaining, by the virtual machine manager, a set of to-be-mapped first virtual CPUs from the at least two virtual CPUs in a current time period, and obtaining, from the at least two physical CPUs, a first physical CPU that has fewest to-be-run tasks in a next time period, obtaining, by the virtual machine manager, a first characteristic value of each first virtual CPU in the set of first virtual CPUs and a second characteristic value of the first physical CPU, where the first characteristic value of each first virtual CPU represents a characteristic of a physical CPU, when the physical CPU runs a task, to which the first virtual CPU is mapped in a time period previous to the current time period and the second characteristic value represents a characteristic of the first physical CPU when the first physical CPU runs a task in the time period previous to the current time period, obtaining, by the virtual machine manager from all the first characteristic values, a target characteristic value that matches the second characteristic value, and mapping a target virtual CPU corresponding to the target characteristic value to the first physical CPU for running.

With reference to the first aspect, in a first possible implementation manner, the first characteristic value of each first virtual CPU includes virtual CPU utilization of each first virtual CPU, memory bus utilization corresponding to a memory bus of a virtual machine to which the first virtual CPU belongs and a quantity of network input/output (I/O) interrupts on the virtual machine to which the first virtual CPU belongs in the time period previous to the current time period. The second characteristic value of the first physical CPU includes physical CPU utilization of the first physical CPU, memory bus utilization of a memory bus of the first physical CPU on a physical host, and a quantity of network I/O interrupts of the first physical CPU on the physical host in the time period previous to the current time period.

With reference to the first possible implementation manner of the first aspect, in a second possible implementation manner, obtaining, by the virtual machine manager from all the first characteristic values, a target characteristic value that matches the second characteristic value includes respectively obtaining, according to the second characteristic value and the first characteristic values of all the first virtual CPUs, similarity values between the second characteristic value and the first characteristic values of all the first virtual CPUs, and obtaining a first characteristic value corresponding to a similarity value that is in a specified value range in all the similarity values, and using the first characteristic value as the target characteristic value that matches the second characteristic value.

With reference to the second possible implementation manner of the first aspect, in a third possible implementation manner, respectively obtaining, according to the second characteristic value and the first characteristic values of all the first virtual CPUs, similarity values between the second characteristic value and the first characteristic values of all the first virtual CPUs includes obtaining the similarity value using the following formula:

$$D_{\Delta ab} = \Sigma(r_{aj} - r_{bj})^2, r_{aj} \in R_a, r_{bj} \in R_b,$$

where $D_{\Delta ab}$ indicates the similarity value, $R_a$ indicates a first characteristic value of a first virtual CPU, $R_b$ indicates the second characteristic value, and $r_{aj}$ and $r_{bj}$ are respectively any parameter in $R_a$ and any parameter in $R_b$ that are corresponding to each other, where the parameters are the virtual CPU utilization and the physical CPU utilization, the memory bus utilization corresponding to the memory bus of the virtual machine to which the first virtual CPU belongs and the memory bus utilization of the memory bus of the first physical CPU on the physical host, and the quantity of the network I/O interrupts on the virtual machine to which the first virtual CPU belongs and the quantity of the network I/O interrupts of the physical CPU on the physical host, where a first characteristic value corresponding to a similarity value that is less than a specified threshold in all the similarity values is the target characteristic value.

With reference to the second possible implementation manner of the first aspect, in a fourth possible implementation manner, respectively obtaining, according to the second characteristic value and the first characteristic values of all the first virtual CPUs, similarity values between the second characteristic value and the first characteristic values of all the first virtual CPUs includes obtaining the similarity value using the following formula:

$$D_{\Delta ab}=\Sigma(r_{ai}-r_{bi})^2+[(r_{aK}-r_{bK})/r_{max}]^2, r_{ai}, r_{aK}\in R_a, r_{bi}, r_{bK}\in R_b,$$

where $D_{\Delta ab}$ indicates the similarity value, $R_a$ indicates a first characteristic value of a first virtual CPU, $R_b$ indicates the second characteristic value, $r_{aK}$ is the quantity of the network I/O interrupts on the virtual machine to which the first virtual CPU belongs in $R_a$, $r_{bK}$ is the quantity of the network I/O interrupts of the physical CPU on the physical host in $R_b$, $r_{ai}$ and $r_{bi}$ are respectively any parameter in $R_a$ and any parameter in $R_b$ that are corresponding to each other except $r_{aK}$ and $r_{bK}$, where the parameters are the virtual CPU utilization and the physical CPU utilization, and the memory bus utilization corresponding to the memory bus of the virtual machine to which the first virtual CPU belongs and the memory bus utilization of the memory bus of the first physical CPU on the physical host, and $r_{max}$ is a maximum quantity of second network I/O interrupts in second characteristic values of all physical CPUs, where a first characteristic value corresponding to a similarity value that is less than a specified threshold in all the similarity values is the target characteristic value.

With reference to the second possible implementation manner of the first aspect, in a fifth possible implementation manner, respectively obtaining, according to the second characteristic value and the first characteristic values of all the first virtual CPUs, similarity values between the second characteristic value and the first characteristic values of all the first virtual CPUs includes obtaining the similarity value using the following formula:

$$D_{\Delta ab}=\Sigma \tfrac{1}{2}[(r_{aj}+r_{bj})-|r_{aj}-r_{bj}|], r_{aj}\in R_a, r_{bj}\in R_b,$$

where $D_{\Delta ab}$ indicates the similarity value, $R_a$ indicates a first characteristic value of a first virtual CPU, $R_b$ indicates the second characteristic value, and $r_{aj}$ and $r_{bj}$ are respectively any parameter in $R_a$ and any parameter in $R_b$ that are corresponding to each other, where the parameters are the virtual CPU utilization and the physical CPU utilization, the memory bus utilization corresponding to the memory bus of the virtual machine to which the first virtual CPU belongs and the memory bus utilization of the memory bus of the first physical CPU on the physical host, and the quantity of the network I/O interrupts on the virtual machine to which the first virtual CPU belongs and the quantity of the network I/O interrupts of the first physical CPU on the physical host, where a first characteristic value corresponding to a similarity value that is greater than a specified threshold in all the similarity values is the target characteristic value.

With reference to any one of the first aspect, or the first to the fifth possible implementation manners, in a sixth possible implementation manner, after obtaining, by the virtual machine manager, a first characteristic value of each first virtual CPU in the set of first virtual CPUs and a second characteristic value of the first physical CPU, the method further includes obtaining a maximum frequency and a minimum frequency of the any one of the at least two physical CPUs when the any one of the at least two physical CPUs runs, and maximum memory bus utilization and minimum memory bus utilization of the physical CPU when running on the physical host, obtaining, according to physical CPU utilization, the maximum frequency, the minimum frequency, the maximum memory bus utilization, and the minimum memory bus utilization that are corresponding to the any one physical CPU, a target frequency that the any one physical CPU needs in current work, and adjusting a current working frequency of the any one physical CPU to the target frequency.

With reference to the sixth possible implementation manner of the first aspect, in a seventh possible implementation manner, for obtaining, according to the physical CPU utilization, the maximum frequency, the minimum frequency, the maximum memory bus utilization, and the minimum memory bus utilization that are corresponding to the any one physical CPU, a target frequency that the any one physical CPU needs in current work, the target frequency is obtained using the following formula:

$$s(R_{cpu}) = \frac{R_{cpu}}{R_{busmax} - R_{busmin}}(f_{max} - f_{min})(R_{busmax} - R_{bus}) + f_{min},$$

where $s(R_{cpu})$ is the target frequency, $R_{cpu}$ is the physical CPU utilization, $f_{max}$ is the maximum frequency of the physical CPU, $f_{min}$ is the minimum frequency of the physical CPU, $R_{busmax}$ is the maximum memory bus utilization, and $R_{busmin}$ is the minimum memory bus utilization.

According to a second aspect, the present disclosure provides a method for adjusting a physical CPU frequency, including obtaining current CPU utilization and a running parameter of a physical CPU, and obtaining, according to the CPU utilization and the running parameter, a target frequency that the physical CPU needs in current work, and adjusting a current working frequency of the physical CPU to the target frequency.

With reference to the second aspect, in a first possible implementation manner, the running parameter includes a maximum frequency and a minimum frequency of the physical CPU when the physical CPU works, and maximum memory bus utilization and minimum memory bus utilization of the physical CPU on a physical host.

With reference to the first possible implementation manner of the second aspect, in a second possible implementation manner, for obtaining, according to the CPU utilization and the running parameter, a target frequency that the physical CPU needs in current work, the target frequency is obtained using the following formula:

$$s(R_{cpu}) = \frac{R_{cpu}}{R_{busmax} - R_{busmin}}(f_{max} - f_{min})(R_{busmax} - R_{bus}) + f_{min},$$

where $s(R_{cpu})$ is the target frequency, $R_{cpu}$ is the CPU utilization, $f_{max}$ is the maximum frequency, $f_{min}$ is the minimum frequency, $R_{busmax}$ is the maximum memory bus utilization, and $R_{busmin}$ is the minimum memory bus utilization.

According to a third aspect, the present disclosure provides an electronic device, including a virtual machine that includes at least one virtual CPU and a virtual machine manager, where the virtual machine manager includes a characteristic obtaining module and a mapping module, where the characteristic obtaining module is configured to obtain a set of to-be-mapped first virtual CPUs from at least two virtual CPUs in a current time period, and obtain, from at least two physical CPUs, a first physical CPU that has fewest to-be-run tasks in a next time period, and obtain a first characteristic value of each first virtual CPU in the set of first virtual CPUs and a second characteristic value of the first physical CPU, where the first characteristic value of each first virtual CPU represents a characteristic of a physical CPU, when the physical CPU runs a task, to which the first virtual CPU is mapped in a time period previous to the current time period, and the second characteristic value represents a characteristic of the first physical CPU when the first physical CPU runs a task in the time period previous to the current time period, and the mapping module is configured to obtain, from all the first characteristic values, a target characteristic value that matches the second characteristic value, and map a target virtual CPU corresponding to the target characteristic value to the first physical CPU for running.

With reference to the third aspect, in a first possible implementation manner, the first characteristic value of each first virtual CPU includes virtual CPU utilization of each first virtual CPU, memory bus utilization corresponding to a memory bus of a virtual machine to which the first virtual CPU belongs, and a quantity of network I/O interrupts on the virtual machine to which the first virtual CPU belongs in the time period previous to the current time period, the second characteristic value of the first physical CPU includes physical CPU utilization of the first physical CPU, memory bus utilization of a memory bus of the first physical CPU on a physical host, and a quantity of network I/O interrupts of the first physical CPU on the physical host in the time period previous to the current time period.

With reference to the first possible implementation manner of the third aspect, in a second possible implementation manner, the mapping module is configured to respectively obtain, according to the second characteristic value and the first characteristic values of all the first virtual CPUs, similarity values between the second characteristic value and the first characteristic values of all the first virtual CPUs, obtain a first characteristic value corresponding to a similarity value that is in a specified value range in all the similarity values, and use the first characteristic value as the target characteristic value that matches the second characteristic value.

With reference to the second possible implementation manner of the third aspect, in a third possible implementation manner, the mapping module is configured to obtain the similarity value using the following formula:

$$D_{\Delta ab} = \Sigma (r_{aj} - r_{bj})^2, r_{aj} \in R_a, r_{bj} \in R_b,$$

where $D_{\Delta ab}$ indicates the similarity value, $R_a$ indicates a first characteristic value of a first virtual CPU, $R_b$ indicates the second characteristic value, and $r_{aj}$ and $r_{bj}$ are respectively any parameter in $R_a$ and any parameter in $R_b$ that are corresponding to each other, where the parameters are the virtual CPU utilization and the physical CPU utilization, the memory bus utilization corresponding to the memory bus of the virtual machine to which the first virtual CPU belongs and the memory bus utilization of the memory bus of the first physical CPU on the physical host, and the quantity of the network I/O interrupts on the virtual machine to which the first virtual CPU belongs and the quantity of the network I/O interrupts of the physical CPU on the physical host, where a first characteristic value corresponding to a similarity value that is less than a specified threshold in all the similarity values is the target characteristic value.

With reference to the second possible implementation manner of the third aspect, in a fourth possible implementation manner, the mapping module is configured to obtain the similarity value using the following formula:

$$D_{\Delta ab} = \Sigma (r_{ai} - r_{bi})^2 + [(r_{aK} - r_{aK}) r_{max}]^2, r_{ai}, r_{aK} \in R_a, r_{bi}, r_{bK} \in R_b,$$

where $D_{\Delta ab}$ indicates the similarity value, $R_a$ indicates a first characteristic value of a first virtual CPU, $R_b$ indicates the second characteristic value, $r_{aK}$ is the quantity of the network I/O interrupts on the virtual machine to which the first virtual CPU belongs in $R_a$, $r_{bK}$ is the quantity of the network I/O interrupts of the physical CPU on the physical host in $R_b$, $r_{aj}$ and $r_{bj}$ are respectively any parameter in $R_a$ and any parameter in $R_b$ that are corresponding to each other except $r_{aK}$ and $r_{bK}$, where the parameters are the virtual CPU utilization and the physical CPU utilization, and the memory bus utilization corresponding to the memory bus of the virtual machine to which the first virtual CPU belongs and the memory bus utilization of the memory bus of the first physical CPU on the physical host, and $r_{max}$ is a maximum quantity of second network I/O interrupts in second characteristic values of all physical CPUs, where a first characteristic value corresponding to a similarity value that is less than a specified threshold in all the similarity values is the target characteristic value.

With reference to the second possible implementation manner of the third aspect, in a fifth possible implementation manner, the mapping module is configured to obtain the similarity value using the following formula:

$$D_{\Delta ab} = \Sigma \tfrac{1}{2} [(r_{aj} + r_{bj}) - |r_{aj} - r_{bj}|], r_{aj} \in R_a, r_{bj} \in R_b,$$

where $D_{\Delta ab}$ indicates the similarity value, $R_a$ indicates a first characteristic value of a first virtual CPU, $R_b$ indicates the second characteristic value, and $r_{aj}$ and $r_{bj}$ are respectively any parameter in $R_a$ and any parameter in $R_b$ that are corresponding to each other, where the parameters are the virtual CPU utilization and the physical CPU utilization, the memory bus utilization corresponding to the memory bus of the virtual machine to which the first virtual CPU belongs and the memory bus utilization of the memory bus of the first physical CPU on the physical host, and the quantity of the network I/O interrupts on the virtual machine to which the first virtual CPU belongs and the quantity of the network I/O interrupts of the first physical CPU on the physical host, where a first characteristic value corresponding to a similarity value that is greater than a specified threshold in all the similarity values is the target characteristic value.

With reference to any one of the third aspect, or the first to the fifth possible implementation manners, in a sixth possible implementation manner, the electronic device further includes a frequency adjustment module, and the frequency adjustment module is configured to, after the virtual machine manager obtains the first characteristic value of each first virtual CPU in the set of first virtual CPUs and the second characteristic value of the first physical CPU, obtain a maximum frequency and a minimum frequency of the any one of the at least two physical CPUs when the any one of the at least two physical CPUs runs, and maximum memory bus utilization and minimum memory bus utilization of the physical CPU when running on the physical host, and obtain, according to physical CPU utilization, the maximum frequency, the minimum frequency, the maximum memory bus utilization, and the minimum memory bus utilization that are corresponding to the any one physical CPU, a target frequency that the any one physical CPU needs in current work; and adjust a current working frequency of the any one physical CPU to the target frequency.

With reference to the sixth possible implementation manner of the third aspect, in a seventh possible implementation manner, the frequency adjustment module is configured to obtain the target frequency using the following formula:

$$s(R_{cpu}) = \frac{R_{cpu}}{R_{busmax} - R_{busmin}}(f_{max} - f_{min})(R_{busmax} - R_{bus}) + f_{min},$$

where $s(R_{cpu})$ is the target frequency, $R_{cpu}$ is the physical CPU utilization, $f_{max}$ is the maximum frequency of the physical CPU, $f_{min}$ is the minimum frequency of the physical CPU, $R_{busmax}$ is the maximum memory bus utilization, and $R_{busmin}$ is the minimum memory bus utilization.

According to a fourth aspect, the present disclosure provides an electronic device, including an obtaining module configured to obtain current CPU utilization and a running parameter of a physical CPU, and an adjustment module configured to obtain, according to the CPU utilization and the running parameter, a target frequency that the physical CPU needs in current work, and adjust a current working frequency of the physical CPU to the target frequency.

With reference to the fourth aspect, in a first possible implementation manner, the running parameter includes a maximum frequency and a minimum frequency of the physical CPU when the physical CPU works, and maximum memory bus utilization and minimum memory bus utilization of the physical CPU on a physical host.

With reference to the first possible implementation manner of the fourth aspect, in a second possible implementation manner, the adjustment module is configured to obtain the target frequency using the following formula:

$$s(R_{cpu}) = \frac{R_{cpu}}{R_{busmax} - R_{busmin}}(f_{max} - f_{min})(R_{busmax} - R_{bus}) + f_{min},$$

where $s(R_{cpu})$ is the target frequency, $R_{cpu}$ is the CPU utilization, $f_{max}$ is the maximum frequency, $f_{min}$ is the minimum frequency, $R_{busmax}$ is the maximum memory bus utilization, and $R_{busmin}$ is the minimum memory bus utilization.

The foregoing one or more technical solutions in the embodiments of the present disclosure have at least the following technical effects.

First characteristic values of all virtual CPUs when all the virtual CPUs run tasks in a previous time period and a second characteristic value of a physical CPU when the physical CPU runs a task in the previous time period are obtained, a target characteristic value that matches the second characteristic value is obtained from the first characteristic values, and a virtual CPU corresponding to the target characteristic value is mapped to the physical CPU for running. Therefore, similar tasks are run on the same physical CPU, which avoids resource contention caused by running of similar tasks on different physical CPUs, thereby resolving prior-art technical problems of the resource contention and a decrease in overall system performance that exist when a virtual CPU is mapped to a physical CPU. Therefore, the resource contention is reduced and the system performance is improved.

DESCRIPTION OF EMBODIMENTS

To resolve prior-art technical problems of resource contention and a decrease in overall system performance that appear when a virtual CPU is mapped to a physical CPU, embodiments of the present disclosure propose a method for mapping between a virtual CPU and a physical CPU and an electronic device.

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

The term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

The following expounds, with reference to the accompanying drawings, main implementation principles, specific implementation manners, and corresponding accomplishable beneficial effects that are of the technical solutions in the embodiments of the present disclosure.

Embodiment 1

Figure 1:
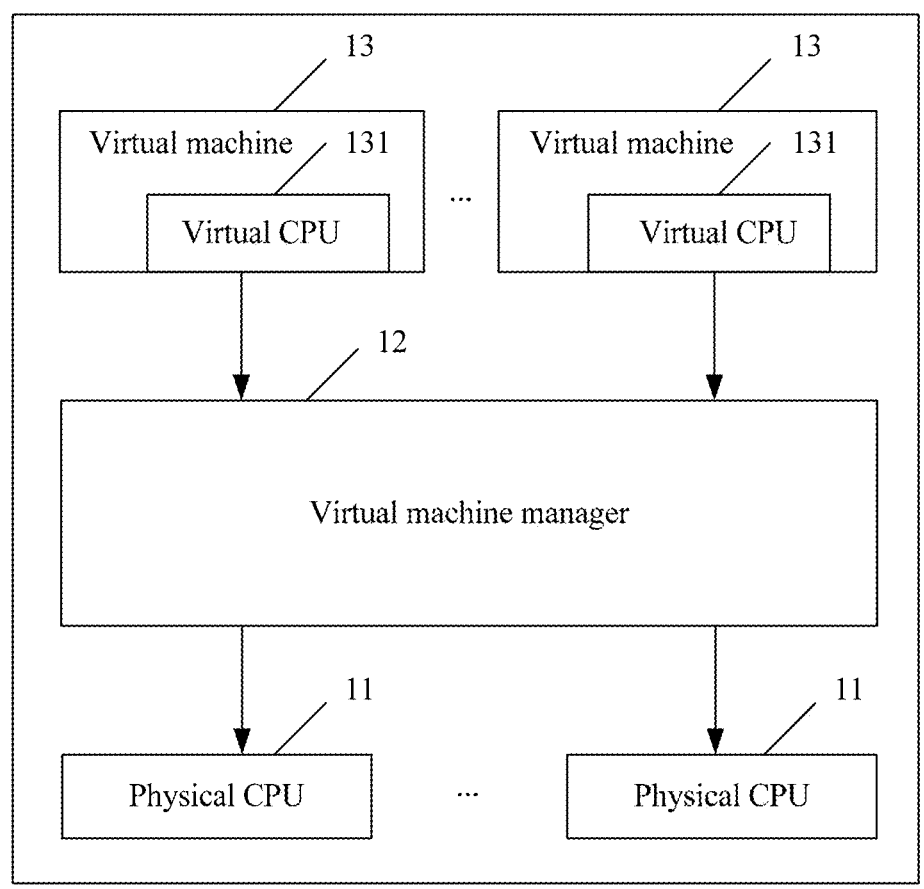
FIG. 1 is a schematic diagram of a multi-core system according to Embodiment 1 of the present disclosure.

Referring to FIG. 1, a method for mapping between a virtual CPU and a physical CPU provided in this embodiment of the present disclosure is applied to a multi-core system. The multi-core system includes at least two physical CPUs 11, a virtual machine manager (VMM) 12, and at least one virtual machine (VM) 13, where each virtual machine 13 includes one or more virtual CPUs 131. In the multi-core system, the virtual machine manager 12 runs on any one of the at least two physical CPUs 11, is configured to implement mapping and management between the virtual CPU 131 and the physical CPU 11, and can map the virtual CPU 131 to any one of the at least two physical CPUs 11 in the system for running.

Figure 2:
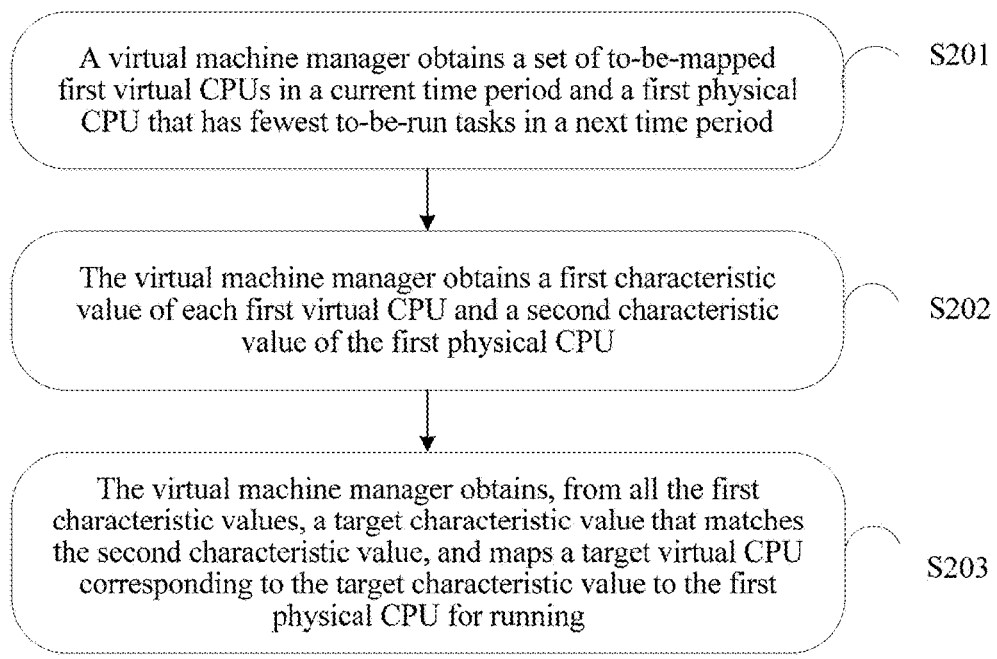
FIG. 2 is a schematic flowchart of a method for mapping between a virtual CPU and a physical CPU according to Embodiment 1 of the present disclosure.

Referring to FIG. 2, the method for mapping between a virtual CPU and a physical CPU provided in this embodiment of the present disclosure includes the following steps.

S201: The virtual machine manager 12 obtains a set of to-be-mapped first virtual CPUs from the at least two virtual CPUs 131 in a current time period, and obtains, from the at least two physical CPUs 11, a first physical CPU that has fewest to-be-run tasks in a next time period.

S202: The virtual machine manager 12 obtains a first characteristic value of each first virtual CPU in the set of first virtual CPUs and a second characteristic value of the first physical CPU, where the first characteristic value of each first virtual CPU represents a characteristic of a physical CPU, when the physical CPU runs a task, to which the first virtual CPU is mapped in a time period previous to the current time period, and the second characteristic value represents a characteristic of the first physical CPU when the first physical CPU runs a task in the time period previous to the current time period.

S203: The virtual machine manager 12 obtains, from all the first characteristic values, a target characteristic value that matches the second characteristic value, and maps a target virtual CPU corresponding to the target characteristic value to the first physical CPU for running.

In the multi-core system, when the virtual CPU 131 runs, a task that the virtual CPU 131 runs may be a CPU bottleneck task, a memory bottleneck task, or an I/O bottleneck task. Correspondingly, when the physical CPU 11 runs, a task that the physical CPU 11 runs may also be a CPU bottleneck task, a memory bottleneck task, or an I/O bottleneck task. Actually, the task that the virtual CPU 131 runs is run on the physical CPU 11 to which the virtual CPU 131 is mapped, and a characteristic of the task that the virtual CPU 131 runs is reflected when the physical CPU 11 to which the virtual CPU 131 is mapped runs the task. For example, a task of the virtual CPU 131 is of a memory bottleneck type (memory usage is relatively high), and therefore relatively high memory usage appears when the physical CPU 11 to which the virtual CPU 131 is mapped runs the task. In order to avoid resource contention caused by mapping of virtual CPUs that run tasks of a same type to different physical CPUs for running simultaneously, the virtual machine manager 12 first executes S201 in a process of mapping the virtual CPUs to the physical CPUs.

In S201, the virtual machine manager obtains the set of to-be-mapped first virtual CPUs from the at least two virtual CPUs 131 in the current time period, and obtains, from the at least two physical CPUs 11, the first physical CPU that has fewest to-be-run tasks in the next time period. Because some physical CPUs 11 have run a relatively large quantity of tasks, for a task allocation balance, a physical CPU that has relatively light load in the next time period needs to be found and used as a physical CPU that is to be mapped to, for example, the first physical CPU.

Afterwards, the virtual machine manager 12 executes S202 to obtain the first characteristic value of each first virtual CPU in the set of first virtual CPUs and the second characteristic value of the first physical CPU. In an implementation process, the first characteristic value of each first virtual CPU may include virtual CPU utilization of the first virtual CPU, memory bus utilization corresponding to a memory bus of a virtual machine to which the first virtual CPU belongs, and a quantity of network I/O interrupts on the virtual machine to which the first virtual CPU belongs in the time period previous to the current time period. Correspondingly, the second characteristic value of the first physical CPU may include physical CPU utilization of the first physical CPU, memory bus utilization of a memory bus of the first physical CPU on a physical host, and a quantity of network I/O interrupts of the first physical CPU on the physical host in the time period previous to the current time period.

The virtual CPU utilization may be used to distinguish whether a task type of a task that the first virtual CPU runs in the previous time period is a CPU bottleneck type, the memory bus utilization of the first virtual CPU may be used to distinguish whether the task type of the task that the first virtual CPU runs in the previous time period is the memory bottleneck type, and the quantity of the network I/O interrupts of the first virtual CPU may be used to distinguish whether a task type of a task that the first virtual CPU runs in the previous time period is an I/O bottleneck type. Correspondingly, the physical CPU utilization of the first physical CPU may be used to distinguish whether a task type of a task that the first physical CPU runs in the previous time period is the CPU bottleneck type, the memory bus utilization of the first physical CPU may be used to distinguish whether the task type of the task that the first physical CPU runs in the previous time period is the memory bottleneck type, and the quantity of the network I/O interrupts of the first physical CPU may be used to distinguish whether the task type of the task that the first physical CPU runs in the previous time period is the I/O bottleneck type.

After obtaining the first characteristic value of each first virtual CPU and the second characteristic value of the first physical CPU, the virtual machine manager 12 continues to execute S203 to obtain, from all the first characteristic values, the target characteristic value that matches the second characteristic value, and map the target virtual CPU corresponding to the target characteristic value to the first physical CPU for running. The target characteristic value matches the first characteristic value, which indicates that a type of a task that the target virtual CPU runs in the time period previous to the current time period is the same as the type of the task that the first physical CPU runs in the time period previous to the current time period. For example, in the time period previous to the current time period, both the task that the target virtual CPU runs and the task that the first physical CPU runs are a CPU bottleneck task. The virtual machine manager 12 may respectively obtain, according to the first characteristic values of all the first virtual CPUs and the second characteristic value, similarity values between the second characteristic value and the first characteristic values of all the first virtual CPUs, and then obtain a first characteristic value corresponding to a similarity value that is in a specified value range in all the similarity values, and use the first characteristic value as the target characteristic value that matches the second characteristic value.

When the first characteristic value of each first virtual CPU includes the virtual CPU utilization of each first virtual CPU, the memory bus utilization, and the quantity of the network I/O interrupts, and the second characteristic value of the first physical CPU includes the physical CPU utilization, the memory bus utilization, and the quantity of the network I/O interrupts, in order to obtain similarity between the task that each first virtual CPU runs in the time period previous to the current time period and the task that the first physical CPU runs in the time period previous to the current time period, this embodiment of the present disclosure provides three manners of calculating a similarity value that is used to represent a value of the similarity.

Manner 1: A first squared value of a difference between the virtual CPU utilization and the physical CPU utilization, a second squared value of a difference between the memory bus utilization of the first virtual CPU and the memory bus utilization of the first physical CPU, and a third squared value of a difference between the quantity of the network I/O interrupts of the first virtual CPU and the quantity of the network I/O interrupts of the first physical CPU are first obtained, and then a sum value of the first squared value, the second squared value, and the third squared value (for example, the similarity value) is obtained. The manner 1 may be represented by a formula 1:

$$D_{\Delta ab}=\Sigma(r_{aj}-r_{bj})^2, r_{aj}\in R_a, r_{bj}\in R_b,$$

where $D_{\Delta ab}$ indicates the similarity value, $R_a$ indicates a first characteristic value of a first virtual CPU, $R_b$ indicates the second characteristic value, and $r_{aj}$ and $r_{bj}$ are respectively any parameter in $R_a$ and any parameter in $R_b$ that are corresponding to each other, where the parameters are the virtual CPU utilization and the physical CPU utilization, the memory bus utilization corresponding to the memory bus of the virtual machine to which the first virtual CPU belongs and the memory bus utilization of the memory bus of the first physical CPU on the physical host, and the quantity of the network I/O interrupts on the virtual machine to which the first virtual CPU belongs and the quantity of the network I/O interrupts of the first physical CPU on the physical host. It should be noted that the formula 1 is also applicable when the characteristic values of the first virtual CPU and the first physical CPU include another parameter other than the CPU utilization, the memory bus utilization, and the quantity of the network I/O interrupts.

Manner 2: A first squared value of a difference between the virtual CPU utilization and the physical CPU utilization and a second squared value of a difference between the memory bus utilization of the first virtual CPU and the memory bus utilization of the first physical CPU are first obtained, a difference between the quantity of the network I/O interrupts of the first virtual CPU and the quantity of the network I/O interrupts of the first physical CPU is obtained, and a third squared value of a ratio between the difference and a maximum quantity of network I/O interrupts in quantities of network I/O interrupts of all the physical CPUs is obtained, and then a sum value of the first squared value, the second squared value, and the third squared value (for example, the similarity value) is obtained. The manner 2 may be represented by a formula 2:

$$D_{\Delta ab}=\Sigma(r_{ai}-r_{bi})^2+[(r_{aK}-r_{bK})/r_{max}]^2, r_{ab}r_{aK}\in R_a, r_{bi}, r_{bK}\in R_b,$$

where $D_{\Delta ab}$ indicates the similarity value, $R_a$ indicates a first characteristic value of a first virtual CPU, $R_b$ indicates the second characteristic value, $r_{aK}$ is the quantity of the network I/O interrupts of the first virtual CPU in $R_a$, $r_{bK}$ is the quantity of the network I/O interrupts of the first physical CPU in $R_b$, $r_{aj}$ and $r_{bj}$ are respectively any parameter in $R_a$ and any parameter in $R_b$ that are corresponding to each other except $r_{aK}$ and $r_{bK}$, where the parameters are the virtual CPU utilization and the physical CPU utilization, and the memory bus utilization corresponding to the memory bus of the virtual machine to which the first virtual CPU belongs and the memory bus utilization of the memory bus of the first physical CPU on the physical host, and $r_{max}$ is a maximum quantity of network I/O interrupts in second characteristic values of all physical CPUs 11. It should be noted that the formula 2 is also applicable when the characteristic values of the first virtual CPU and the first physical CPU include another parameter other than the CPU utilization, the memory bus utilization, and the quantity of the network I/O interrupts.

Manner 3: Smaller parameters between all parameters in the first characteristic value of each first virtual CPU and all corresponding parameters in the second characteristic value of the first physical CPU are obtained, and then a sum value of all the smaller parameters is obtained as the similarity value. The similarity value may be obtained using a formula 3:

$$D_{\Delta ab}=\Sigma \tfrac{1}{2}[(r_{aj}+r_{bj})-|r_{aj}-r_{bj}|], r_{aj}\in R_a, r_{bj}\in R_b,$$

where $D_{\Delta ab}$ indicates the similarity value, $R_a$ indicates a first characteristic value of a first virtual CPU, $R_b$ indicates the second characteristic value, and $r_{aj}$ and $r_{bj}$ are respectively any parameter in $R_a$ and any parameter in $R_b$ that are corresponding to each other, where the parameters are: the virtual CPU utilization and the physical CPU utilization, the memory bus utilization corresponding to the memory bus of the virtual machine to which the first virtual CPU belongs and the memory bus utilization of the memory bus of the first physical CPU on the physical host, and the quantity of the network I/O interrupts on the virtual machine to which the first virtual CPU belongs and the quantity of the network I/O interrupts of the first physical CPU on the physical host.

The similarity value $D_{\Delta ab}$ obtained by calculation using the formula 3 is in direct proportion to the value of the similarity. For example, a smaller similarity value indicates smaller similarity, and a larger similarity value indicates larger similarity. After obtaining the similarity values between the first characteristic values of all the first virtual CPUs and the second characteristic value of the first physical CPU using the formula 3, the virtual machine manager 12 obtains a first characteristic value corresponding to a similarity value that is greater than a specified threshold in all the similarity values, and uses the first characteristic value as the target characteristic value. Therefore, the virtual machine manager 12 may map the target virtual CPU corresponding to the target characteristic value to the first physical CPU for running.

Conversely, the similarity value $D_{\Delta ab}$ obtained by calculation using the formula 1 or formula 2 is in inverse proportion to the value of the similarity. For example, a smaller similarity value indicates larger similarity, and a larger similarity value indicates smaller similarity. After obtaining the similarity values between the first characteristic values of all the first virtual CPUs and the second characteristic value of the first physical CPU using the formula 1 or formula 2, the virtual machine manager 12 obtains a first characteristic value corresponding to a similarity value that is less than a specified threshold in all the similarity values, and uses the first characteristic value as the target characteristic value. Therefore, the virtual machine manager 12 may map the target virtual CPU corresponding to the target characteristic value to the first physical CPU for running.

It should be noted that, a skilled person may set the foregoing specified threshold differently according to different similarity value calculation formulas. For example, it is assumed that the similarity value is obtained by calculation using the formula 1, the specified threshold $D_{\Delta max}$ may be obtained using $$D_{\Delta max}=a\Sigma r_{Aj}^2, r_{Aj}\in R_A,$$

where $R_A$ is a set of characteristic values in all the first virtual CPUs, $r_{Aj}$ is a corresponding characteristic value in $R_A$, α is an adjustment parameter, and generally 0<α≤1. In addition, the specified threshold may also be automatically set according to an average quantity of virtual CPUs that are allowed to be mapped to one physical CPU in a mapping period (a process in which the virtual machine manager 12 completes mapping of the virtual CPUs to the physical CPUs once) in the multi-core system. For example, the average quantity of virtual CPUs that are allowed to be mapped to one physical CPU is 1, if the similarity value is obtained by calculation using the formula 1 or formula 2, a second smallest similarity value in all the similarity values is automatically taken as the specified threshold, and the target characteristic value is a smallest similarity value in all the similarity values, or if the similarity value is obtained by calculation using the formula 3, conversely, the target characteristic value is a largest similarity value in all the similarity values, and the rest can be deduced from this.

Figure 3:
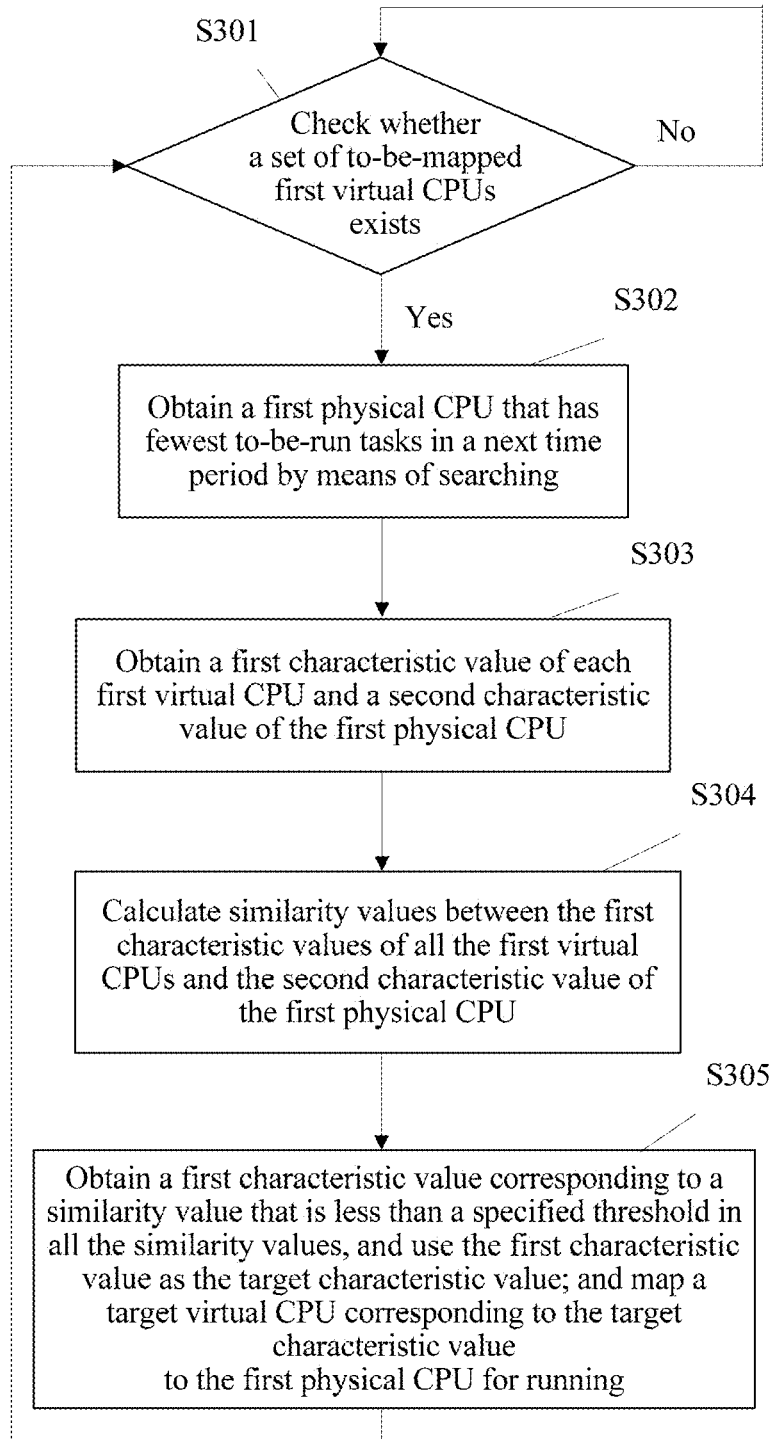
FIG. 3 is a schematic diagram of detailed steps of mapping a virtual CPU to a physical CPU according to Embodiment 1 of the present disclosure.

Referring to FIG. 3, the following describes, using an instance, the method for mapping between a virtual CPU and a physical CPU.

S301: In the current time period, the virtual machine manager checks whether the set of to-be-mapped first virtual CPUs exists in a current virtual CPU list, and if the set of to-be-mapped first virtual CPUs exists in the current virtual CPU list, continues to execute S302.

For example, it is checked that the set of to-be-mapped first virtual CPUs exists in the current virtual CPU list, and the set of first virtual CPUs includes first virtual CPUs "A" and "B". The set of first virtual CPUs is obtained, and a next step continues.

S302: The virtual machine manager obtains the first physical CPU that has fewest to-be-run tasks in the time period after the current time period by means of searching. Load of some physical CPUs that have a plenty of tasks from mapped virtual CPUs and/or have a plenty of tasks of the physical CPUs is relatively heavy in the next time period, and therefore the physical CPU that has fewest to-be-run tasks is searched for so as to reduce load of another physical CPU.

For example, an electronic device has four physical CPUs, which are respectively "A1", "B1", "C1", and "D1". Both the physical CPU "B1" and the physical CPU "C1" need to run tasks of two mapped virtual CPUs in the next time period, and the physical CPU "D1" also needs to run a task of one mapped virtual CPU in the next time period, but the physical CPU "A1" does not need to run any task in the next time period. Therefore, the virtual machine manager obtains the first physical CPU, for example, the physical CPU "A1", and the next step continues.

S303: The virtual machine manager obtains the first characteristic value of each first virtual CPU and the second characteristic value of the first physical CPU.

For example, an obtained second characteristic value of the first physical CPU "A1" is physical CPU utilization 80%, memory bus utilization 50%, and a quantity 4 of network I/O interrupts, a first characteristic value of the first virtual CPU "A" is virtual CPU utilization 75%, memory bus utilization 55%, and a quantity 4 of network I/O interrupts, and a first characteristic value of the first virtual CPU "B" is virtual CPU utilization 50%, memory bus utilization 70%, and a quantity 2 of network I/O interrupts.

S304: For all the first virtual CPUs, the virtual machine manager calculates the similarity values between the first characteristic values of all the first virtual CPUs and the second characteristic value of the first physical CPU.

For example, the virtual machine manager obtains the similarity values between characteristic values of all the first virtual CPUs and the first physical CPU by calculation using the formula 2, which are respectively a similarity value between the first virtual CPU "A" and the first physical CPU "A1" is 0.005, and a similarity value between the first virtual CPU "B" and the first physical CPU "A1" is 0.38.

S305: The virtual machine manager obtains a first characteristic value corresponding to a similarity value that is less than a specified threshold in all the similarity values, and uses the first characteristic value as the target characteristic value, and maps the target virtual CPU corresponding to the target characteristic value to the first physical CPU for running.

For example, the similarity values obtained in the foregoing step are respectively 0.005 and 0.38. Because a difference part between characteristic values is calculated using the formula 2, the value of the similarity is in inverse proportion to the similarity value. It is assumed that the specified threshold is 0.38; therefore, a first characteristic value corresponding to the similarity value 0.005 that is less than the specified threshold is obtained as the target characteristic value, and the target virtual CPU "A" corresponding to the target characteristic value is mapped to the first physical CPU "A1" for running.

Using the foregoing technical solution, virtual CPUs that run tasks of similar types are mapped to a same physical CPU that runs a task of a type that is similar to those of the virtual CPUs (for example, two virtual CPUs that run memory bottleneck tasks are mapped to one physical CPU that runs a memory bottleneck task) so as to prevent running tasks of a same task type from being mapped to different physical CPUs for running, thereby avoiding unnecessary resource contention caused by simultaneous running of the running tasks of the same task type. Therefore, the resource contention is reduced, and system performance is improved.

Further, after obtaining the first characteristic value of each first virtual CPU and the second characteristic value of the first physical CPU, the virtual machine manager provided in this embodiment of the present disclosure may further obtain a maximum frequency and a minimum frequency of the any one of the at least two physical CPUs when the any one of the at least two physical CPUs runs, and maximum memory bus utilization and minimum memory bus utilization of the physical CPU when running on the physical host; and obtain, according to physical CPU utilization, the maximum frequency, the minimum frequency, the maximum memory bus utilization, and the minimum memory bus utilization that are corresponding to the any one physical CPU, a target frequency that the any one physical CPU needs in current work, and adjust a current working frequency of the any one physical CPU to the target frequency. It should be noted that, a characteristic value of a physical CPU is changeable, but a minor change during relatively short time may be ignored. Therefore, the physical CPU maintains the target frequency during the relatively short time.

In a implementation process, the virtual machine manager may obtain the target frequency using the following formula:

$$s(R_{cpu}) = \frac{R_{cpu}}{R_{busmax} - R_{busmin}}(f_{max} - f_{min})(R_{busmax} - R_{bus}) + f_{min},$$

where $s(R_{cpu})$ is the target frequency, $R_{cpu}$ is the physical CPU utilization, $f_{max}$ is the maximum frequency of the physical CPU, $f_{min}$ is the minimum frequency of the physical CPU, $R_{busmax}$ is the maximum memory bus utilization, and $R_{busmin}$ is the minimum memory bus utilization.

It is found by means of an experiment that a target frequency obtained by calculation according to current physical CPU utilization, a maximum/minimum frequency, and maximum/minimum memory bus utilization that are of a physical CPU can better achieve a technical effect of balancing energy consumption performance.

Embodiment 2

Figure 4:
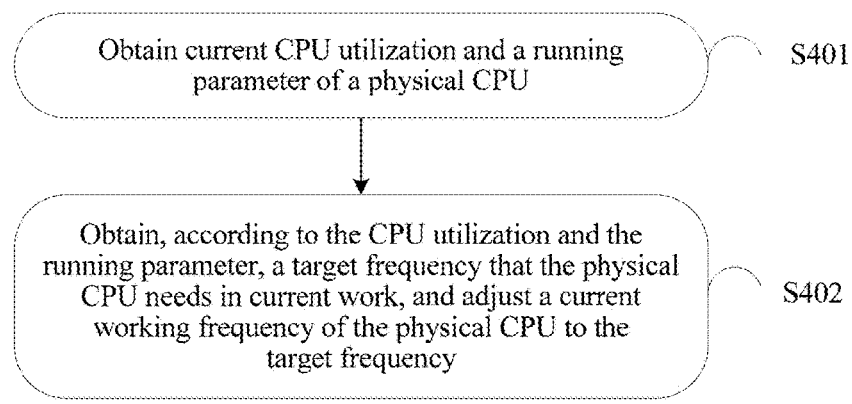
FIG. 4 is a schematic flowchart of a method for adjusting a physical CPU frequency according to Embodiment 2 of the present disclosure.

Referring to FIG. 4, this embodiment of the present disclosure provides a method for adjusting a physical CPU frequency. The method includes the following steps, S401: Obtain current CPU utilization and a running parameter of a physical CPU.

S402: Obtain, according to the CPU utilization and the running parameter, a target frequency that the physical CPU needs in current work, and adjust a current working frequency of the physical CPU to the target frequency.

In a implementation process, the running parameter of the physical CPU includes a maximum frequency and a minimum frequency of the physical CPU when the physical CPU works, and maximum memory bus utilization and minimum memory bus utilization of the physical CPU on a physical host. According to the current CPU utilization and the running parameter of the physical CPU, in this embodiment of the present disclosure, the target frequency that the physical CPU needs in the current work may be obtained using the following formula:

$$s(R_{cpu}) = \frac{R_{cpu}}{R_{busmax} - R_{busmin}}(f_{max} - f_{min})(R_{busmax} - R_{bus}) + f_{min},$$

where $s(R_{cpu})$ the target frequency, $R_{cpu}$ is the CPU utilization, $f_{max}$ is the maximum frequency, $f_{min}$ is the minimum frequency, $R_{busmax}$ is the maximum memory bus utilization, and $R_{busmin}$ is the minimum memory bus utilization.

It is found by means of an experiment that a target frequency obtained by calculation according to current CPU utilization, a maximum/minimum frequency, and maximum/minimum memory bus utilization that are of a physical CPU can better achieve a technical effect of balancing energy consumption performance.

Embodiment 3

Figure 5:
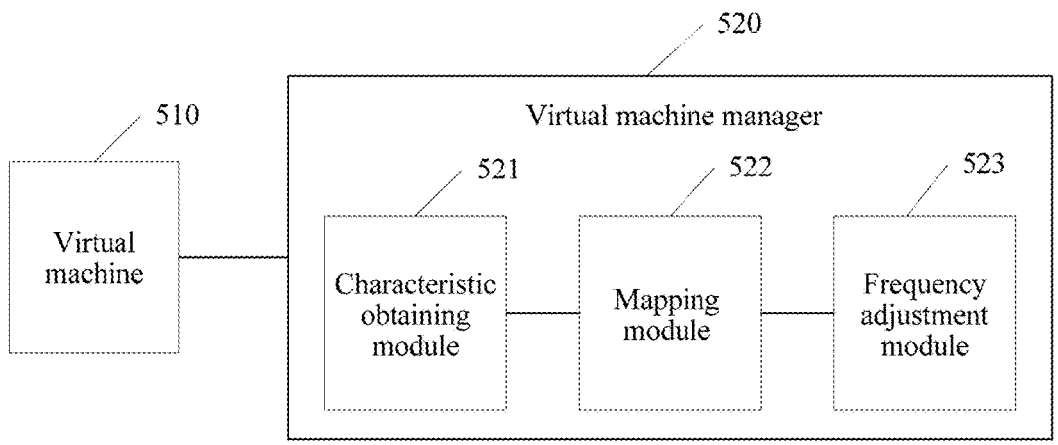
FIG. 5 is a structural block diagram of an electronic device according to Embodiment 3 of the present disclosure.

Referring to FIG. 5, this embodiment of the present disclosure provides an electronic device, including a virtual machine 510 that includes at least one virtual CPU, and a virtual machine manager 520, where the virtual machine manager 520 includes a characteristic obtaining module 521 and a mapping module 522.

The characteristic obtaining module 521 is configured to obtain a set of to-be-mapped first virtual CPUs from at least two virtual CPUs in a current time period, and obtain, from at least two physical CPUs, a first physical CPU that has fewest to-be-run tasks in a next time period, and obtain a first characteristic value of each first virtual CPU in the set of first virtual CPUs and a second characteristic value of the first physical CPU, where the first characteristic value of each first virtual CPU represents a characteristic of a physical CPU, when the physical CPU runs a task, to which the first virtual CPU is mapped in a time period previous to the current time period, and the second characteristic value represents a characteristic of the first physical CPU when the first physical CPU runs a task in the time period previous to the current time period.

The mapping module 522 is configured to obtain, from all the first characteristic values, a target characteristic value that matches the second characteristic value, and map a target virtual CPU corresponding to the target characteristic value to the first physical CPU for running.

In an implementation process, the first characteristic value of each first virtual CPU includes virtual CPU utilization of each first virtual CPU, memory bus utilization corresponding to a memory bus of the virtual machine 510 to which the first virtual CPU belongs, and a quantity of network I/O interrupts on the virtual machine 510 to which the first virtual CPU belongs in the time period previous to the current time period.

The second characteristic value of the first physical CPU includes physical CPU utilization of the first physical CPU, memory bus utilization of a memory bus of the first physical CPU on a physical host, and a quantity of network I/O interrupts of the first physical CPU on the physical host in the time period previous to the current time period.

In an implementation process, the mapping module 522 is configured to respectively obtain, according to the second characteristic value and the first characteristic values of all the first virtual CPUs, similarity values between the second characteristic value and the first characteristic values of all the first virtual CPUs, and obtain a first characteristic value corresponding to a similarity value that is in a specified value range in all the similarity values, and use the first characteristic value as the target characteristic value that matches the second characteristic value.

In an implementation process, the mapping module 522 may be configured to obtain the similarity value using the following formula:

$$D_{\Delta ab} = \Sigma(r_{aj} - r_{bj})^2, r_{aj} \in R_a, r_{bj} \in R_b,$$

where $D_{\Delta ab}$ indicates the similarity value, $R_a$ indicates a first characteristic value of a first virtual CPU, $R_b$ indicates the second characteristic value, and $r_{aj}$ and $r_{bj}$ are respectively any parameter in $R_a$ and any parameter in $R_b$ that are corresponding to each other, where the parameters are the virtual CPU utilization and the physical CPU utilization, the memory bus utilization corresponding to the memory bus of the virtual machine 510 to which the first virtual CPU belongs and the memory bus utilization of the memory bus of the first physical CPU on the physical host, and the quantity of the network I/O interrupts on the virtual machine 510 to which the first virtual CPU belongs and the quantity of the network I/O interrupts of the physical CPU on the physical host.

A first characteristic value corresponding to a similarity value that is less than a specified threshold in all the similarity values is the target characteristic value.

In an implementation process, the mapping module 522 may also be configured to obtain the similarity value using the following formula:

$$D_{\Delta ab} = \Sigma(r_{ai} - r_{bi})^2 + [(r_{aK} - r_{bK})/r_{max}]^2, r_{ai}, r_{aK} \in R_a, r_{bi}, r_{bK} \in R_b,$$

where $D_{\Delta ab}$ indicates the similarity value, $R_a$ indicates a first characteristic value of a first virtual CPU, $R_b$ indicates the second characteristic value, $r_{aK}$ is the quantity of the network I/O interrupts on the virtual machine 510 to which the first virtual CPU belongs in $R_a$, $r_{bK}$ is the quantity of the network I/O interrupts of the physical CPU on the physical host in $R_b$, $r_{ai}$ and $r_{bi}$ are respectively any parameter in $R_a$ and any parameter in $R_b$ that are corresponding to each other except $r_{aK}$ and $r_{bK}$, where the parameters are the virtual CPU utilization and the physical CPU utilization, and the memory bus utilization corresponding to the memory bus of the virtual machine 510 to which the first virtual CPU belongs and the memory bus utilization of the memory bus of the first physical CPU on the physical host, and $r_{max}$ is a maximum quantity of second network I/O interrupts in second characteristic values of all physical CPUs.

A first characteristic value corresponding to a similarity value that is less than a specified threshold in all the similarity values is the target characteristic value.

In an implementation process, the mapping module 522 may also be configured to obtain the similarity value using the following formula:

$$D_{\Delta ab} = \Sigma^{1/2}[(r_{aj}+r_{bj})=|r_{aj}-r_{bj}|], r_{aj} \in R_a, r_{bj} \in R_b,$$

where $D_{\Delta ab}$ indicates the similarity value, $R_a$ indicates a first characteristic value of a first virtual CPU, $R_b$ indicates the second characteristic value, and $r_{aj}$ and $r_{bj}$ are respectively any parameter in $R_a$ and any parameter in $R_b$ that are corresponding to each other, where the parameters are: the virtual CPU utilization and the physical CPU utilization, the memory bus utilization corresponding to the memory bus of the virtual machine 510 to which the first virtual CPU belongs and the memory bus utilization of the memory bus of the first physical CPU on the physical host, and the quantity of the network I/O interrupts on the virtual machine 510 to which the first virtual CPU belongs and the quantity of the network I/O interrupts of the first physical CPU on the physical host.

A first characteristic value corresponding to a similarity value that is greater than a specified threshold in all the similarity values is the target characteristic value.

In an implementation process, the electronic device further includes a frequency adjustment module 523 configured to, after the virtual machine manager 520 obtains the first characteristic value of each first virtual CPU in the set of first virtual CPUs and the second characteristic value of the first physical CPU, obtain a maximum frequency and a minimum frequency of any one of the at least two physical CPUs when the any one of the at least two physical CPUs runs, and maximum memory bus utilization and minimum memory bus utilization of the physical CPU when running on the physical host, and obtain, according to physical CPU utilization, the maximum frequency, the minimum frequency, the maximum memory bus utilization, and the minimum memory bus utilization that are corresponding to the any one physical CPU, a target frequency that the any one physical CPU needs in current work, and adjust a current working frequency of the any one physical CPU to the target frequency.

In an implementation process, the frequency adjustment module 523 is configured to obtain the target frequency using the following formula:

$$s(R_{cpu}) = \frac{R_{cpu}}{R_{busmax} - R_{busmin}} (f_{max} - f_{min})(R_{busmax} - R_{bus}) + f_{min},$$

where $s(R_{cpu})$ is the target frequency, $R_{cpu}$ is the physical CPU utilization, $f_{max}$ is the maximum frequency of the physical CPU, $f_{min}$ is the minimum frequency of the physical CPU, $R_{busmax}$ is the maximum memory bus utilization, and $R_{busmin}$ is the minimum memory bus utilization.

The various types of variations and instances in the methods of mapping between a virtual CPU and a physical CPU in the foregoing embodiments in FIG. 1 to FIG. 3 are also applicable to the electronic device in this embodiment. With the foregoing detailed description of the methods of mapping between a virtual CPU and a physical CPU, a person skilled in the art can clearly understand the implementation manner of the electronic device in this embodiment. Therefore, for conciseness of the specification, details are not repeatedly described herein.

Embodiment 4

Figure 6:
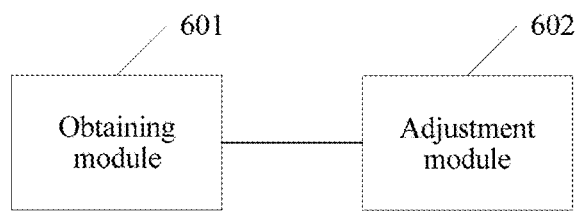
FIG. 6 is a structural block diagram of an electronic device according to Embodiment 4 of the present disclosure.

Referring to FIG. 6, this embodiment of the present disclosure provides an electronic device, including an obtaining module 601 configured to obtain current CPU utilization and a running parameter of a physical CPU, and an adjustment module 602 configured to obtain, according to the CPU utilization and the running parameter, a target frequency that the physical CPU needs in current work, and adjust a current working frequency of the physical CPU to the target frequency.

In an implementation process, the running parameter includes a maximum frequency and a minimum frequency of the physical CPU when the physical CPU works, and maximum memory bus utilization and minimum memory bus utilization of the physical CPU on a physical host.

In an implementation process, the adjustment module 602 is configured to obtain the target frequency using the following formula:

$$s(R_{cpu}) = \frac{R_{cpu}}{R_{busmax} - R_{busmin}} (f_{max} - f_{min})(R_{busmax} - R_{bus}) + f_{min},$$

where $s(R_{cpu})$ is the target frequency, $R_{cpu}$ is the CPU utilization, $f_{max}$ is the maximum frequency, $f_{min}$ is the minimum frequency, $R_{busmax}$ is the maximum memory bus utilization, and $R_{busmin}$ is the minimum memory bus utilization.

The various types of variations and instances in the method for adjusting a physical CPU frequency in the foregoing embodiment in FIG. 4 are also applicable to the electronic device in this embodiment. With the foregoing detailed description of the method for adjusting a physical CPU frequency, a person skilled in the art can clearly understand the implementation manner of the electronic device in this embodiment. Therefore, for conciseness of the specification, details are not repeatedly described herein.

Embodiment 5

Figure 7:
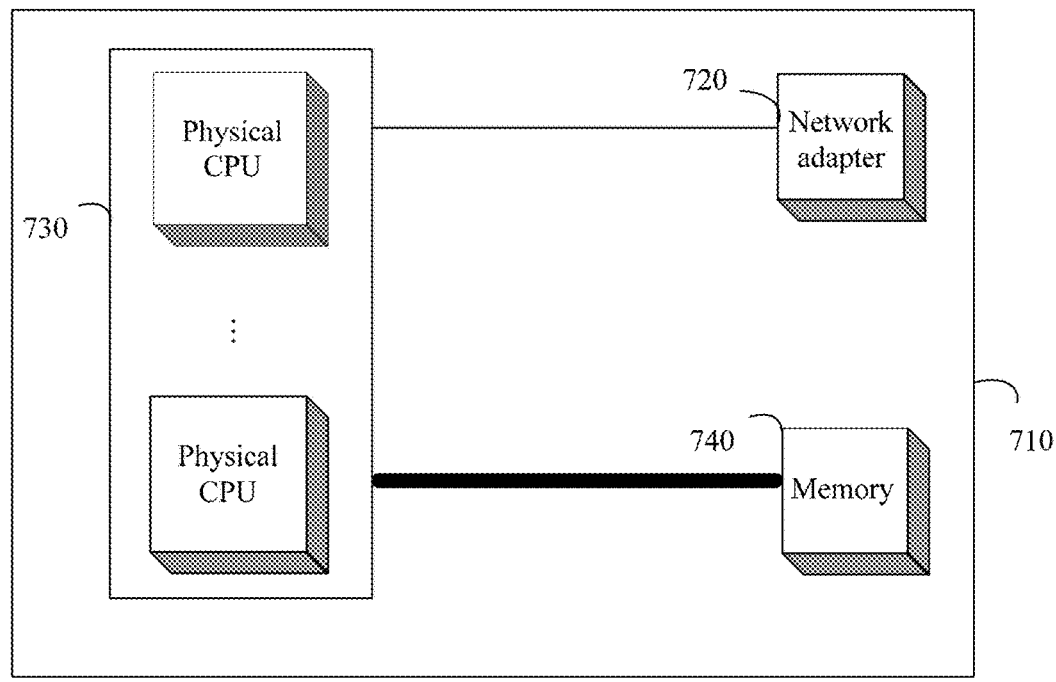
FIG. 7 is a structural block diagram of an electronic device according to Embodiment 5 of the present disclosure.

Referring to FIG. 7, this embodiment of the present disclosure provides an electronic device. The electronic device includes a mainboard 710, a network adapter 720 that is disposed on the mainboard 710 and includes a network I/O interface, and at least two physical CPUs 730 that are disposed on the mainboard 710, connected to the network adapter 720, and connected to a memory 740 using a memory bus.

A virtual machine manager runs on any one of the at least two physical CPUs 730, at least one virtual machine further runs on the at least two physical CPUs 730, and the at least one virtual machine includes at least two virtual CPUs.

The virtual machine manager obtains a set of to-be-mapped first virtual CPUs from the at least two virtual CPUs in a current time period, and obtains, from the at least two physical CPUs, a first physical CPU that has fewest to-be-run tasks in a next time period.

The virtual machine manager obtains a first characteristic value of each first virtual CPU in the set of first virtual CPUs and a second characteristic value of the first physical CPU, where the first characteristic value of each first virtual CPU represents a characteristic of a physical CPU, when the physical CPU runs a task, to which the first virtual CPU is mapped in a time period previous to the current time period, and the second characteristic value represents a characteristic of the first physical CPU when the first physical CPU runs a task in the time period previous to the current time period.

The virtual machine manager obtains, from all the first characteristic values, a target characteristic value that matches the second characteristic value, and maps a target virtual CPU corresponding to the target characteristic value to the first physical CPU for running.

In an implementation process, the first characteristic value of each first virtual CPU includes virtual CPU utilization of each first virtual CPU, memory bus utilization corresponding to a memory bus of a virtual machine to which the first virtual CPU belongs, and a quantity of network I/O interrupts on the virtual machine to which the first virtual CPU belongs in the time period previous to the current time period.

The second characteristic value of the first physical CPU includes physical CPU utilization of the first physical CPU, memory bus utilization of a memory bus of the first physical CPU on a physical host, and a quantity of network I/O interrupts of the first physical CPU on the physical host in the time period previous to the current time period.

In an implementation process, that the virtual machine manager obtains, from all the first characteristic values, a target characteristic value that matches the second characteristic value includes respectively obtaining, according to the second characteristic value and the first characteristic values of all the first virtual CPUs, similarity values between the second characteristic value and the first characteristic values of all the first virtual CPUs, and obtaining a first characteristic value corresponding to a similarity value that is in a specified value range in all the similarity values, and using the first characteristic value as the target characteristic value that matches the second characteristic value.

In an implementation process, the respectively obtaining, according to the second characteristic value and the first characteristic values of all the first virtual CPUs, similarity values between the second characteristic value and the first characteristic values of all the first virtual CPUs includes obtaining the similarity value using the following formula:

$$D_{\Delta ab} = \Sigma(r_{aj} - r_{bj})^2, r_{aj} \in R_a, r_{bj} \in R_b,$$

where $D_{\Delta ab}$ indicates the similarity value, $R_a$ indicates a first characteristic value of a first virtual CPU, $R_b$ indicates the second characteristic value, and $r_{aj}$ and $r_{bj}$ are respectively any parameter in $R_a$ and any parameter in $R_b$ that are corresponding to each other, where the parameters are the virtual CPU utilization and the physical CPU utilization, the memory bus utilization corresponding to the memory bus of the virtual machine to which the first virtual CPU belongs and the memory bus utilization of the memory bus of the first physical CPU on the physical host, and the quantity of the network I/O interrupts on the virtual machine to which the first virtual CPU belongs and the quantity of the network I/O interrupts of the physical CPU on the physical host.

A first characteristic value corresponding to a similarity value that is less than a specified threshold in all the similarity values is the target characteristic value.

In an implementation process, the respectively obtaining, according to the second characteristic value and the first characteristic values of all the first virtual CPUs, similarity values between the second characteristic value and the first characteristic values of all the first virtual CPUs includes obtaining the similarity value using the following formula:

$$D_{\Delta ab} = \Sigma(r_{ai} - r_{bi})^2 + [(r_{aK} - r_{bK})/r_{max}]^2, r_{ai}, r_{aK} \in R_a, r_{bi}, r_{bK} \in R_b,$$

where $D_{\Delta ab}$ indicates the similarity value, $R_a$ indicates a first characteristic value of a first virtual CPU, $R_b$ indicates the second characteristic value, $r_{aK}$ is the quantity of the network I/O interrupts on the virtual machine to which the first virtual CPU belongs in $R_a$, $r_{bK}$ is the quantity of the network I/O interrupts of the physical CPU on the physical host in $R_b$, $r_{aj}$ and $r_{bj}$ are respectively any parameter in $R_a$ and any parameter in $R_b$ that are corresponding to each other except $r_{aK}$ and $r_{bK}$, where the parameters are the virtual CPU utilization and the physical CPU utilization, and the memory bus utilization corresponding to the memory bus of the virtual machine to which the first virtual CPU belongs and the memory bus utilization of the memory bus of the first physical CPU on the physical host, and $r_{max}$ is a maximum quantity of second network I/O interrupts in second characteristic values of all physical CPUs.

A first characteristic value corresponding to a similarity value that is less than a specified threshold in all the similarity values is the target characteristic value.

In an implementation process, the respectively obtaining, according to the second characteristic value and the first characteristic values of all the first virtual CPUs, similarity values between the second characteristic value and the first characteristic values of all the first virtual CPUs includes obtaining the similarity value using the following formula:

$$D_{\Delta ab} = \Sigma \tfrac{1}{2}[(r_{aj} + r_{bj}) - |r_{aj} - r_{bj}|], r_{aj} \in R_a, r_{bj} \in R_b$$

where $D_{\Delta ab}$ indicates the similarity value, $R_a$ indicates a first characteristic value of a first virtual CPU, $R_b$ indicates the second characteristic value, and $r_{aj}$ and $r_{bj}$ are respectively any parameter in $R_a$ and any parameter in $R_b$ that are corresponding to each other, where the parameters are the virtual CPU utilization and the physical CPU utilization, the memory bus utilization corresponding to the memory bus of the virtual machine to which the first virtual CPU belongs and the memory bus utilization of the memory bus of the first physical CPU on the physical host, and the quantity of the network I/O interrupts on the virtual machine to which the first virtual CPU belongs and the quantity of the network I/O interrupts of the first physical CPU on the physical host.

A first characteristic value corresponding to a similarity value that is greater than a specified threshold in all the similarity values is the target characteristic value.

In an implementation process, after the virtual machine manager obtains the first characteristic value of each first virtual CPU in the set of first virtual CPUs and the second characteristic value of the first physical CPU, the virtual machine manager further obtain a maximum frequency and a minimum frequency of the any one of the at least two physical CPUs when the any one of the at least two physical CPUs runs, and maximum memory bus utilization and minimum memory bus utilization of the physical CPU when running on the physical host, and obtain, according to physical CPU utilization, the maximum frequency, the minimum frequency, the maximum memory bus utilization, and the minimum memory bus utilization that are corresponding to the any one physical CPU, a target frequency that the any one physical CPU needs in current work, and adjusting a current working frequency of the any one physical CPU to the target frequency.

In an implementation process, for obtaining, according to the physical CPU utilization, the maximum frequency, the minimum frequency, the maximum memory bus utilization, and the minimum memory bus utilization that are corresponding to the any one physical CPU, a target frequency that the any one physical CPU needs in current work, the target frequency is obtained using the following formula:

$$s(R_{cpu}) = \frac{R_{cpu}}{R_{busmax} - R_{busmin}} (f_{max} - f_{min})(R_{busmax} - R_{bus}) + f_{min},$$

where $s(R_{cpu})$ is the target frequency, $R_{cpu}$ is the physical CPU utilization, $f_{max}$ is the maximum frequency of the physical CPU, $f_{min}$ is the minimum frequency of the physical CPU, $R_{busmax}$ is the maximum memory bus utilization, and $R_{busmin}$ is the minimum memory bus utilization.

The various types of variations and instances in the methods of mapping between a virtual CPU and a physical CPU in the foregoing embodiments in FIG. 1 to FIG. 3 are also applicable to the electronic device in this embodiment. With the foregoing detailed description of the methods of mapping between a virtual CPU and a physical CPU, a person skilled in the art can clearly understand the implementation manner of the electronic device in this embodiment. Therefore, for conciseness of the specification, details are not repeatedly described herein.

Embodiment 6

Figure 8:
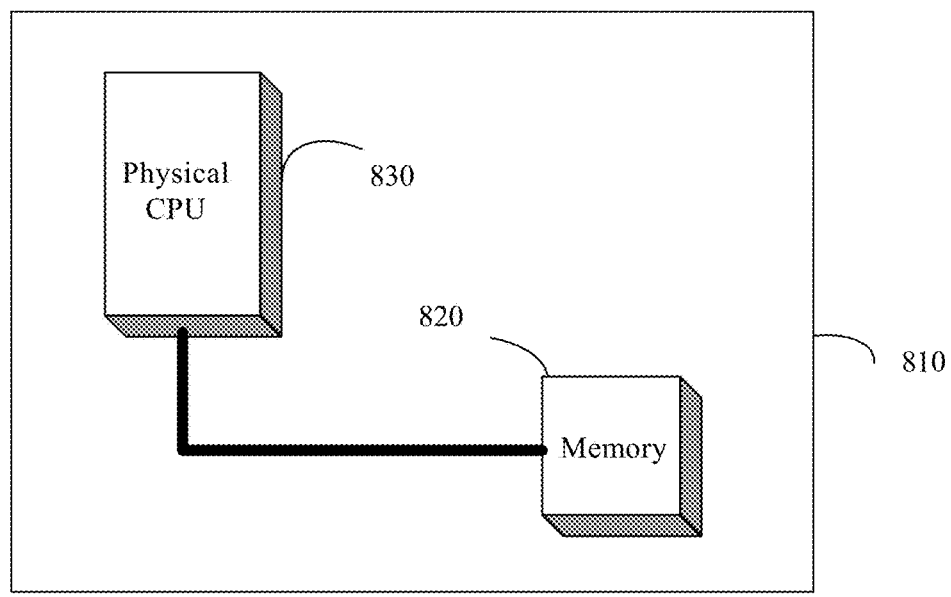
FIG. 8 is a structural block diagram of an electronic device according to Embodiment 6 of the present disclosure.

Referring to FIG. 8, this embodiment of the present disclosure provides an electronic device, including a mainboard 810, a memory 820, and a physical CPU 830 that is disposed on the mainboard 810 and connected to the memory 820 using a memory bus.

The physical CPU 830 is configured to obtain current CPU utilization and a running parameter of the physical CPU 830, obtain, according to the CPU utilization and the running parameter, a target frequency that the physical CPU 830 needs in current work, and adjust a current working frequency of the physical CPU 830 to the target frequency.

In an implementation process, the running parameter includes a maximum frequency and a minimum frequency of the physical CPU 830 when the physical CPU 830 works, and maximum memory bus utilization and minimum memory bus utilization of the physical CPU 830 on a physical host.

In an implementation process, the physical CPU 830 is configured to obtain the target frequency using the following formula:

$$s(R_{cpu}) = \frac{R_{cpu}}{R_{busmax} - R_{busmin}} (f_{max} - f_{min})(R_{busmax} - R_{bus}) + f_{min},$$

where $s(R_{cpu})$ is the target frequency, $R_{cpu}$ is the CPU utilization, $f_{max}$ is the maximum frequency, $f_{min}$ is the minimum frequency, $R_{busmax}$ is the maximum memory bus utilization, and $R_{busmin}$ is the minimum memory bus utilization.

The various types of variations and instances in the method for adjusting a physical CPU frequency in the foregoing embodiment in FIG. 4 are also applicable to the electronic device in this embodiment. With the foregoing detailed description of the method for adjusting a physical CPU frequency, a person skilled in the art can clearly understand the implementation manner of the electronic device in this embodiment. Therefore, for conciseness of the specification, details are not repeatedly described herein.

One or more technical solutions of the embodiments of the present disclosure may implement the following technical effects.

A first characteristic value of a virtual CPU and a second characteristic value of a physical CPU are obtained, a target physical CPU whose task type matches a task type of a task that the virtual CPU currently runs is obtained according to the first characteristic value and the second characteristic value, and the virtual CPU is mapped to the physical CPU for running. Therefore, similar tasks are run on the same physical CPU, which avoids resource contention caused by running of similar tasks on different physical CPUs, thereby resolving prior-art technical problems of the resource contention and a decrease in overall system performance that exist when a virtual CPU is mapped to a physical CPU. Therefore, the resource contention is reduced, and the system performance is improved.

A person skilled in the art should understand that the embodiments of the present disclosure may be provided as a method, a system, or a computer program product. Therefore, the present disclosure may use a form of hardware only embodiments software only embodiments, or embodiments with a combination of software and hardware. Moreover, the present disclosure may use a form of a computer program product that is implemented on one or more computer-usable storage media (including but not limited to a disk memory, a compact disc read only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine so that the instructions executed by a computer or a processor of any other programmable data processing device generate an apparatus for implementing a function in one or more processes in the flowcharts and/or in one or more blocks in the block diagrams.

These computer program instructions may be stored in a computer readable memory that can instruct the computer or any other programmable data processing device to work in a specific manner so that the instructions stored in the computer readable memory generate an artifact that includes an instruction apparatus. The instruction apparatus implements a function in one or more processes in the flowcharts and/or in one or more blocks in the block diagrams.

These computer program instructions may be loaded onto a computer or another programmable data processing device so that a series of operations and steps are performed on the computer or the another programmable device, thereby generating computer-implemented processing. Therefore, the instructions executed on the computer or the another programmable device provide steps for implementing a function in one or more processes in the flowcharts and/or in one or more blocks in the block diagrams.

A person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A method for mapping between a virtual central processing unit (CPU) and a physical CPU, the method being applied to a multi-core system, the multi-core system comprising at least two physical CPUs, a virtual machine manager, and at least one virtual machine, the at least one virtual machine comprising at least two virtual CPUs, and the method comprising:
   obtaining, by the virtual machine manager, a set of to-be-mapped first virtual CPUs from the at least two virtual CPUs in a current time period;
   obtaining, from the at least two physical CPUs, a first physical CPU that has a fewest to-be-run tasks;
   obtaining, by the virtual machine manager, a first attribute value of each first virtual CPU in the set of first virtual CPUs and a second attribute value of the first physical CPU, the first attribute value of each first virtual CPU representing an attribute of a physical CPU to which the first virtual CPU is mapped in a previous time period, and the second attribute value representing an attribute of the first physical CPU in the previous time period;
   obtaining, by the virtual machine manager from all the first attribute values, a target attribute value that matches the second attribute value by:
      obtaining, according to the second attribute value and the first attribute value of each first virtual CPU, a similarity value between the second attribute value and the first attribute value of each first virtual CPU;
      obtaining a first attribute value corresponding to a similarity value that is in a specified value range in all similarity values; and
      using the first attribute value as the target attribute value that matches the second attribute value; and
   mapping a target virtual CPU corresponding to the target attribute value to the first physical CPU for running.

2. The method of claim 1, wherein obtaining, according to the second attribute value and the first attribute value of each first virtual CPU, the similarity value between the second attribute value and the first attribute value of each first virtual CPU comprises obtaining the similarity value according to $$D_{\Delta ab}=\Sigma(r_{aj}-r_{bj})^2, r_{aj}\in R_a, R_{bj}\in R_b,$$

$D_{\Delta ab}$ indicating the similarity value, $R_a$ indicating a first attribute value of a first virtual CPU, $R_b$ indicating the second attribute value, $r_{aj}$ and $r_{bj}$ respectively being any parameter in $R_a$ and any parameter in $R_b$ that correspond to each other, and a first attribute value corresponding to a similarity value that is less than a specified threshold in all the similarity values being the target attribute value.

3. The method of claim 1, wherein obtaining, according to the second attribute value and the first attribute value of each first virtual CPU, the similarity value between the second attribute value and the first attribute value of each first virtual CPU comprises obtaining the similarity value according to $$D_{\Delta ab}=\Sigma(r_{ai}-r_{bi})^2+[(r_{aK}-r_{bK})/r_{max}]^2, r_{ai},r_{aK}\in R_a, r_{bi}, r_{bK}\in R_b,$$

$D_{\Delta ab}$ indicating the similarity value, $R_a$ indicating a first attribute value of a first virtual CPU, $R_b$ indicating the second attribute value, $r_{aK}$ being the quantity of the network input/output (I/O) interrupts on the virtual machine to which the first virtual CPU belongs in $R_a$, $r_{bK}$ being the quantity of the network I/O interrupts of the physical CPU on a physical host in $R_b$, $r_{ai}$ and $r_{bi}$ respectively being any parameter in $R_a$ and any parameter in $R_b$ that correspond to each other except $r_{aK}$ and $r_{bK}$, and a first attribute value corresponding to a similarity value that is less than a specified threshold in all the similarity values being the target attribute value.

4. The method of claim 1, wherein obtaining, according to the second attribute value and the first attribute value of each first virtual CPU, the similarity value between the second attribute value and the first attribute value of each first virtual CPU comprises obtaining the similarity value according to $$D_{\Delta ab}=\Sigma \tfrac{1}{2}[(r_{aj}+r_{bj})-|r_{aj}-r_{bj}|], r_{aj}\in R_a, r_{bj}\in R_b,$$

$D_{\Delta ab}$ indicating the similarity value, $R_a$ indicating a first attribute value of a first virtual CPU, $R_b$ indicating the second attribute value, $r_{aj}$ and $r_{bj}$ respectively being any parameter in $R_a$ and any parameter in $R_b$ that correspond to each other, and a first attribute value corresponding to a similarity value that is greater than a specified threshold in all the similarity values being the target attribute value.

5. A method for mapping between a virtual central processing unit (CPU) and a physical CPU, the method being applied to a multi-core system, the multi-core system comprising at least two physical CPUs, a virtual machine manager, and at least one virtual machine, the at least one virtual machine comprising at least two virtual CPUs, and the method comprising:
   obtaining, by the virtual machine manager, a set of to-be-mapped first virtual CPUs from the at least two virtual CPUs in a current time period;
   obtaining, from the at least two physical CPUs, a first physical CPU that has a fewest to-be-run tasks;
   obtaining, by the virtual machine manager, a first attribute value of each first virtual CPU in the set of first virtual CPUs and a second attribute value of the first physical CPU, the first attribute value of each first virtual CPU representing an attribute of a physical CPU to which the first virtual CPU is mapped in a previous time period, the first attribute value of each first virtual CPU comprising virtual CPU utilization of each first virtual CPU, memory bus utilization of the virtual machine to which the first virtual CPU belongs, and a quantity of network input/output (I/O) interrupts on the virtual machine to which the first virtual CPU belongs in the previous time period, the second attribute value representing an attribute of the first physical CPU in the previous time period, and the second attribute value of the first physical CPU comprising physical CPU utilization of the first physical CPU, memory bus utilization of the first physical CPU on a physical host, and a quantity of network I/O interrupts of the first physical CPU on the physical host in the previous time period;

obtaining, by the virtual machine manager from all the first attribute values, a target attribute value that matches the second attribute value; and mapping a target virtual CPU corresponding to the target attribute value to the first physical CPU for running.

6. The method of claim 1, further comprising:

obtaining a maximum frequency and a minimum frequency of a physical CPU of the at least two physical CPUs when the physical CPU runs;

obtaining a maximum memory bus utilization and a minimum memory bus utilization of the physical CPU when running on the physical CPU;

obtaining, according to physical CPU utilization, the maximum frequency, the minimum frequency, the maximum memory bus utilization, and the minimum memory bus utilization, a target frequency; and adjusting a current working frequency of the physical CPU to the target frequency.

7. The method of claim 6, wherein the target frequency is obtained) according to $$s(R_{cpu}) = \frac{R_{cpu}}{R_{busmax} - R_{busmin}}(f_{max} - f_{min})(R_{busmax} - R_{bus}) + f_{min},$$

$s(R_{cpu})$ being the target frequency, $R_{cpu}$ being the physical CPU utilization, $f_{max}$ being the maximum frequency of the physical CPU, $f_{min}$ being the minimum frequency of the physical CPU, $R_{busmax}$ being the maximum memory bus utilization, and $R_{busmin}$ being the minimum memory bus utilization.

8. A device comprising:

a memory configured to store instructions; and a processor coupled to the memory and configured to execute the instructions to:

obtain a set of to-be-mapped first virtual central processing units (CPUs) from at least two virtual CPUs in a current time period;

obtain, from at least two physical CPUs, a first physical CPU that has a fewest to-be-run tasks;

obtain a first attribute value of each first virtual CPU in the set of first virtual CPUs and a second attribute value of the first physical CPU, the first attribute value of each first virtual CPU representing an attribute of a physical CPU to which the first virtual CPU is mapped in a previous time period, and the second attribute value representing an attribute of the first physical CPU in the previous time period;

obtain a target attribute value that matches the second attribute value from all the first attribute values by:

obtaining a similarity value between the second attribute value and the first attribute value of each first virtual CPU according to the second attribute value and the first attribute value of each first virtual CPU;

obtaining a first attribute value corresponding to a similarity value that is in a specified value range in all similarity values; and using the first attribute value as the target attribute value that matches the second attribute value; and map a target virtual CPU corresponding to the target attribute value to the first physical CPU for running.

9. The device of claim 8, wherein the processor is further configured to obtain the similarity value according to $$D_{\Delta ab} = \Sigma(r_{aj} - r_{bj})^2, r_{aj} \in R_a, r_{bj} \in R_b,$$

$D_{\Delta ab}$ indicating the similarity value, $R_a$ indicating a first attribute value of a first virtual CPU, $R_b$ indicating the second attribute value, $r_{aj}$ and $r_{bj}$ respectively being any parameter in $R_a$ and any parameter in $R_b$ that correspond to each other, and a first attribute value corresponding to a similarity value that is less than a specified threshold in all the similarity values being the target attribute value.

10. The device of claim 8, wherein the processor is further configured to obtain the similarity value according to $$D_{\Delta ab} = \Sigma(r_{ai} - r_{bi})^2 + [(r_{aK} - r_{bK})/r_{max}]^2, r_{ai}, r_{aK} \in R_a, r_{bi}, r_{bK} \in R_b,$$

$D_{\Delta ab}$ indicating the similarity value, $R_a$ indicating a first attribute value of a first virtual CPU, $R_b$ indicating the second attribute value, $r_{aK}$ being the quantity of the network input/output (I/O) interrupts on a virtual machine to which the first virtual CPU belongs in $R_a$, $r_{bK}$ being the quantity of the network I/O interrupts of the physical CPU on a physical host in $R_b$, $r_{ai}$ and $r_{bi}$ respectively being any parameter in $R_a$ and any parameter in $R_b$ that correspond to each other except $r_{aK}$ and $r_{bK}$, and a first attribute value corresponding to a similarity value that is less than a specified threshold in all the similarity values being the target attribute value.

11. The device of claim 8, wherein the processor is further configured to obtain the similarity value according to $$D_{\Delta ab} = \Sigma \frac{1}{2}[(r_{aj} + r_{bj}) - |r_{aj} - r_{bj}|], r_{aj} \in R_a, r_{bj} \in R_b,$$

$D_{\Delta ab}$ indicating the similarity value, $R_a$ indicating a first attribute value of a first virtual CPU, $R_b$ indicating the second attribute value, $r_{aj}$ and $r_{bj}$ respectively being any parameter in $R_a$ and any parameter in $R_b$ that correspond to each other, and a first attribute value corresponding to a similarity value that is greater than a specified threshold in all the similarity values being the target attribute value.

12. The device of claim 8, wherein the first attribute value of each first virtual CPU comprises virtual CPU utilization of each first virtual CPU, memory bus utilization of a virtual machine to which the first virtual CPU belongs, and a quantity of network input/output (I/O) interrupts on the virtual machine to which the first virtual CPU belongs in the previous time period, and the second attribute value of the first physical CPU comprising physical CPU utilization of the first physical CPU, memory bus utilization of the first physical CPU on a physical host, and a quantity of network I/O interrupts of the first physical CPU on the physical host in the previous time period.

13. The device of claim 8, wherein the processor is further configured to:

obtain a maximum frequency and a minimum frequency of a physical CPU of the at least two physical CPUs when the physical CPU runs;

obtain a maximum memory bus utilization and a minimum memory bus utilization of the physical CPU when running on the physical CPU;

obtain a target frequency according to physical CPU utilization, the maximum frequency, the minimum frequency, the maximum memory bus utilization, and the minimum memory bus utilization; and adjust a current working frequency of the physical CPU to the target frequency.

14. The device of claim 13, wherein the target frequency is obtained according to $$s(R_{cpu}) = \frac{R_{cpu}}{R_{busmax} - R_{busmin}}(f_{max} - f_{min})(R_{busmax} - R_{bus}) + f_{min},$$

$s(R_{cpu})$ is the target frequency, $R_{cpu}$ is the physical CPU utilization, $f_{max}$ is the maximum frequency of the physical CPU, $f_{min}$ is the minimum frequency of the physical CPU, $R_{busmax}$ is the maximum memory bus utilization, and $R_{busmin}$ is the minimum memory bus utilization.

\* \* \* \* \*

UNITED STATES PATENT AND TRADEMARK OFFICE
CERTIFICATE OF CORRECTION

PATENT NO. : 10,216,530 B2
APPLICATION NO. : 15/375919
DATED : February 26, 2019
INVENTOR(S) : Jian Li, Haibing Guan and Qiang Gu Page 1 of 1

It is certified that error appears in the above-identified patent and that said Letters Patent is hereby corrected as shown below:

On the Title Page

1. Item (30), Line 1: "201410262063" should read "201410262063.4"

In the Claims

2. Column 23, Line 60: "$D_{\Delta ab}=\Sigma(r_{aj}-r_{bj})^2, r_{aj}\in R_a, R_{bj}\in R_b$" should read " $D_{\Delta ab}=\sum(r_{aj}-r_{bj})^2, r_{aj}\in R_a, r_{bj}\in R_b$ "

3. Column 25, Line 20: "obtained) according" should read "obtained according"

Signed and Sealed this
Thirtieth Day of April, 2019

Andrei Iancu
*Director of the United States Patent and Trademark Office*